No. 816,493. PATENTED MAR. 27, 1906.
H. J. MOORE.
LOOSE LEAF BINDER FRAME AND LEAF THEREFOR.
APPLICATION FILED AUG. 28, 1905.
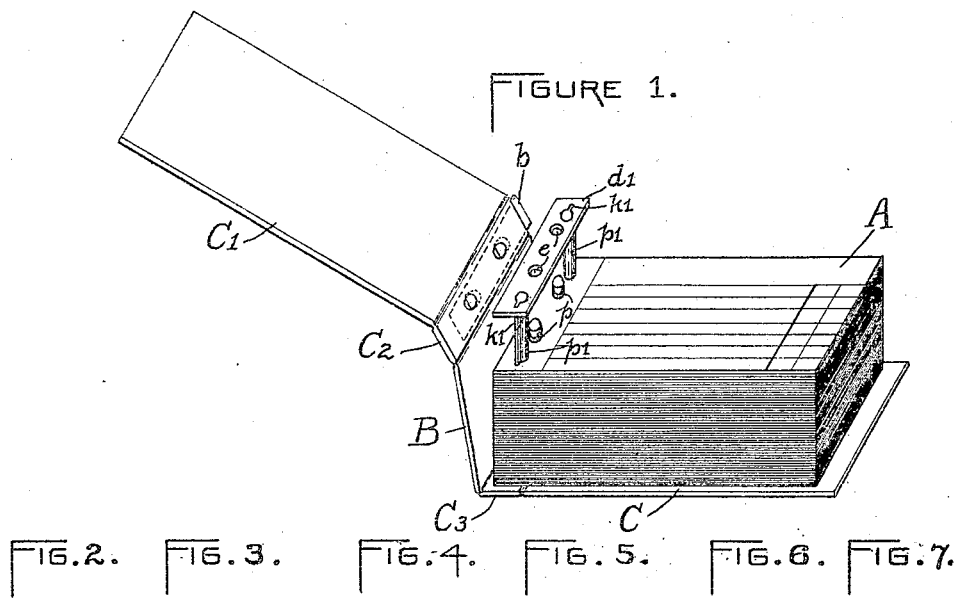
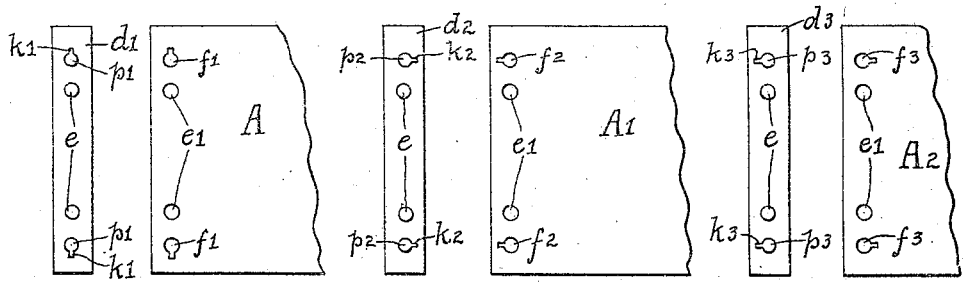
WITNESSES:
Albert C. Bell.
Clara M. Simer.
INVENTOR:
Henry J. Moore.
By W. F. Cooley.
ATTY.

UNITED STATES PATENT OFFICE.

HENRY J. MOORE, OF ROCHESTER, NEW YORK, ASSIGNOR TO JOHN C. MOORE CORPORATION, OF ROCHESTER, NEW YORK.

LOOSE-LEAF-BINDER FRAME AND LEAF THEREFOR.

No. 816,493.   Specification of Letters Patent.   Patented March 27, 1906.

Application filed August 28, 1905. Serial No. 276,004.

*To all whom it may concern:*

Be it known that I, HENRY J. MOORE, a citizen of the United States, residing at Rochester, in the county of Monroe and State of New York, have invented an Improvement in Loose-Leaf-Binder Frames and Leaves Therefor, of which the following is a specification.

This invention while relating to loose-leaf binders and leaves therefor in general has more especial reference to that class of loose-leaf binders in which two or more impaling-pins are rigidly secured to a binding-frame and are arranged to engage all of the leaves in common while such leaves are held in position on such impaling-posts by means of a strip or bar, preferably of metal, carrying one or more other impaling-posts and arranged also to engage and enter suitable openings therefor in the leaves. In such binders mechanism is provided for locking the removable bar carrying the second impaling-post or impaling-posts in the binder-frame and upon the first impaling-posts which are rigidly secured to the binder-frame.

It is oftentimes very desirable to provide a mechanical distinction between the leaves which are to be used in different loose-leaf binder frames in order that through carelessness in assembling the leaves upon the binder-frames the leaves may not be wrongly assembled in the different books, as oftentimes other distinctions are of so slight a character as to be overlooked.

The object of this invention is to provide means for mechanically preventing the use of any leaves in any such binder-frame except those specifically designed therefor—that is, the removable bar or plate of the binder-frame and the impaling-posts thereon are so designed and conformed relatively to the holes in the leaves to be engaged thereby as to prevent its insertion in place except when the proper leaves having openings therein corresponding to the posts carried by such bar have been placed over the first two or more impaling-posts, rigidly secured to the binder-frame.

While it is not absolutely essential that there be more than one impaling-post carried by the removable bar or plate of the binder-frame, I prefer, however, to use two such impaling-posts on such removable bar.

In carrying out my present invention I pre- fer to give the removable impaling-post or posts an irregular conformation, preferably such as would be secured by forming a projection upon one side of an impaling-post of substantially the size used for the permanent post, and I prefer also that the conformation of these removable posts and of the openings in the leaves therefor be of a character to avoid any tendency to catch or bind.

In the accompanying drawings I have shown my present invention as applied to a loose-leaf-binder frame and leaves therefor such as shown in a former United States patent of mine dated August 9, 1904, and numbered 767,161.

In the binder-frame shown in such patent the removable bar is provided with two impaling-posts, and upon one of the edges of each of these impaling-posts for the purpose of the present invention I form a projection, whereby such posts may be prevented from insertion in any leaves except such as have notches or openings therein corresponding in location and conformation to the impaling-posts carried by the removable bar.

I have found it desirable in carrying out my present invention to use impaling-posts on the removable bar of practically uniform cross-section and to secure the large number of variations in the removable posts by changing the angular disposition of the projection on such removable posts. In this way by the use of two removable posts and by varying the angular disposition of the projections thereon so as to give eight different directions for such projections, each varying successively from the preceding one by forty-five degrees, I am enabled to secure a large number of variations in the leaves and in the impaling-posts therefor without varying in any way the cross-section of the posts themselves or of the punch for forming the notches or openings in the leaves for the posts, and I am thus enabled to economically produce a large range of variations without any material increase in the stock of tools necessary therefor.

The accompanying drawings, illustrating my invention, are as follows:

Figure 1 shows in perspective a loose-leaf binder having removable posts and leaves arranged to be engaged thereby in accordance with my present invention. Figs. 2, 4, and 6 show different arrangements of the removable posts, while Figs. 3, 5, and 7 show, respectively, the style of leaf adapted to each of such arrangements of the removable posts and the bar or plate to which they are connected.

Similar letters refer to similar parts throughout the several views.

Referring to the drawings, my binder-frame is, as already mentioned, substantially that shown in my former United States patent above referred to, and comprises the back B, to which are attached the connecting plates or sections $C^2$ and $C^3$, to which are respectively hinged the cover-plates $C'$ and $C$. To the connecting-plate $C^3$ there are secured the impaling-pins $p$, circular in form and having notches in their upper ends for engagement with the locking mechanism $b$, such as shown in my above-mentioned United States patent. The upper ends of the post $p$ when engaged by the locking mechanism are first extended through the openings $e$ therefor in the removable plate $d'$. The impaling pins or posts $p$ $p$ are cylindrical in form, as shown, and are located and operated in exactly the same way as described in my above-mentioned United States patent, and the location of the pins or posts $p'$ is substantially the same as illustrated and described in my said patent, from which they differ only as to their conformation, being shown cylindrical in such former patent while in the present invention they are of an irregular cross-section.

For the purpose of securing a large number of variations in the conformation of the posts $p'$, secured in the removable plate $d'$, and a correspondingly large number of different notchings of the leaves to be used in connection therewith, I prefer, for the sake of economy, to give to the posts $p'$ a conformation such as is shown in Figs. 1, 2, 4, and 6, comprising, essentially, a cylindrical cross-section with a radial extension formed thereon substantially such as would be constituted by a key or feather extending in a straight line the entire length of the post and on one side thereof.

By giving to the posts $p'$ different angular positions to cause the projection or ridges $k'$ formed thereon to extend in different directions I am enabled to secure by means of posts of substantially the same cross-sectional conformation a large number of different arrangements and correspondingly different notchings of the leaves to adapt them to be used therewith. Figs. 2, 4, and 6 show three of such different arrangements which may be secured by a quarter-rotation of the posts $p'$ upon their axes. I have found it practicable to vary the angular disposition of the projections $k'$ upon the posts $p'$ by as small an angle as forty-five degrees, and by the combined effect of different angular arrangements of the posts $p'$ in the same plate I am enabled to secure a large number of different arrangements of such posts necessitating a correspondingly large number of different notchings of the leaves to be used therewith.

I desire to call attention to the fact that but one pair of punches and their corresponding dies is necessary to produce this large number of different notchings in the leaves, the different notchings being effected by the different angular dispositions or arrangements which may be given to the punches and their corresponding dies relatively to the back edge of the leaf to be notched or punched. In a similar way the plates $d'$ may be notched differently and by the same punches and dies that are used in punching the leaves, after which the posts $p'$ may be suitably secured in such plates $d'$ so punched. It will of course be understood that the angular disposition given to the punches in punching the leaves will serve automatically to secure the proper location of the projections $k'$ on the posts $p'$ when the holes therefor are punched by these punches and dies in the plates $d'$, in which such posts $p'$ are to be secured.

Referring to the drawings, Figs. 2 and 3 show the style of posts $p'$, having projections $k'$ thereon, such as are adapted to use with the binder-frame and removable posts, shown in Fig. 1. The notches or openings $f'$ in each leaf A is, as shown, adapted to use with the posts $p'$ shown in Fig. 2 and having projection $k'$ thereon.

In Fig. 5 there is shown a leaf $A'$, having the openings $e'$ therein and with the openings $f^2$ therein conformed to receive the posts $p^2$ upon the removable bar $d^2$ and having the projections $k^2$, as shown in Fig. 4. In Fig. 7 there is shown a style of leaf $A^2$, having also the openings $e'$ therein and also the openings $f^3$ conformed to receive the posts $p^3$ with the projections $k^3$ thereon and secured in the plate $d^3$, as shown in Fig. 6. In Figs. 2, 4, and 6 the plates $d'$, $d^2$, and $d^3$ are shown with the posts $p'$, $p^2$, and $p^3$, respectively, therein as projecting upwardly from the plane of the drawings and toward the observer, so that such plates before insertion in the leaves are to be turned one-half a revolution over to the right, causing the posts to project downwardly or away from the observer before insertion in the leaves.

By the arrangement shown in the drawings, and by varying the angular disposition of the pins $p'$ by an amount equaling forty-five degrees for each of such variations successively from the starting-point, and by combining each of the different variations in one of such posts with each of the different variations in the other one of such posts $p'$, I am enabled to secure sixty-four different styles of punchings and the correspondingly differently disposed impaling-pins $p'$ in the removable plates $d'$. It will of course be understood that no one of the sixty-four different arrangements just above mentioned for the pins $p'$ in the plate $d'$ is capable of being used with any of the sixty-four different modifications of the leaves, except that particular one having the notches arranged in accordance therewith. Thus it will be seen that there is afforded a simple and economical means for providing a large number of different styles closely approximating each other, but no one of them capable of use except with the particular style of removable plate and pins carried thereby especially adapted thereto.

Attention is called to the fact that the conformation of the openings $f'$, $f^2$, and $f^3$ in the leaves A, A', and A², respectively, is such that the leaves A, A', and A² are held in alinement by the corresponding posts therefor, $p'$, $p^2$, and $p^3$, respectively, independently of the projecting ridges $k'$, $k^2$, and $k^3$ on such posts, whereby by the substitution of plain posts in any binder-frame in place of the posts $p'$, $p^2$, and $p^3$, such binder-frame becoming then substantially such as shown in my above-mentioned former United States patent, the leaves of all such classes A, A', and A² may be used in such a binder-frame indiscriminately and held in perfect alinement by either pair of posts therein independently of the other pair. Thus it will be seen that the leaves of any one of the several different classes of leaves A, A', and A² may be used in a classified binder-frame only of its own corresponding class, while all of such leaves of all classes may be used in a binder-frame having all of its posts plain and cylindrical, as shown in my former patent and as above described. The substitution of the plain cylindrical posts for the posts $p'$, $p^2$, and $p^3$, &c., in a loose-leaf-binder frame is so thoroughly obvious and so fully shown in my above-mentioned former United States patent as to call for no further illustration or description herein. I have found this a very desirable and important feature of my present invention, as there is provided thereby means for classifying the leaves in different binder-frames in such a way that such different binder-frames may be devoted to different classes of merchandise or different features of the business of a concern or corporation, and thereafter all of such leaves upon which there are entries or charges against a single individual or concern or different classes of memoranda bearing on one common subject may be collected and arranged in a common binder-frame in such a way that all of the entries or charges against such single individual or concern or all of the different classes of memoranda bearing upon any one particular subject may be collected and arranged according to any desired method or order.

An important feature of my present invention comprises then a means for mechanically classifying the leaves and preventing their use in any classified binder-frame except the particular one corresponding thereto and with such mechanical classifications effected in the leaves by modifications which do not in any way prevent their use in such common binder-frame having plain prismatic posts, and in which latter frame they are held in perfect alinement.

It will of course be understood that the projecting ridges on the posts must correspond to the lateral extensions in the openings therefor—that is, such ridges must be adapted to enter such extensions in the holes without mutilating the leaves. In the accompanying claims I shall therefore make use of the term "corresponding" in this sense, meaning thereby that the ridges on the posts correspond to the lateral extensions in the openings in the leaves in that they are adapted to enter such extensions without mutilation of the leaves. It is preferable, however, that the ridges on the posts be conformed to fit quite measurably at least the extensions in the openings in the leaves. I have found such classifications and the means for maintaining them a very important aid in properly assorting the leaves in keeping them in stock.

What I claim is—

1. In a system of loose-leaf-binder construction and leaves therefor, leaves having all of them a common opening or common openings adapted to be engaged by a fixed post or fixed posts in all the binder-frames, all of such leaves having another opening or other openings adapted to be engaged by removable posts in the binder-frames, such leaves divided into classes by such other opening or openings therein, binder-frames each having a fixed post or fixed posts adapted to engage the first-mentioned opening or openings in all of such leaves, and a series of removable posts or pairs of posts each adapted to use in any one of such binder-frames but conformed to engage the second-mentioned opening or openings in but one of such classes of leaves.

2. In a system of loose-leaf-binder construction and leaves therefor, leaves having all of them a common opening or common openings adapted to be engaged by a fixed post or fixed posts in all the binder-frames, all of such leaves having another opening or other openings adapted to be engaged by removable posts in the binder-frames, such leaves divided into classes by such other opening or openings therein, binder-frames each having a fixed post or fixed posts adapted to engage the first-mentioned opening or openings in all of such leaves, and a series of removable posts or pairs of posts each adapted to use in any one of such binder-frames but conformed to engage the second-mentioned opening or openings in but one of such classes of leaves, such first openings circular and the fixed posts arranged to engage the same of cylindrical form and such removable posts having a general cylindrical form with a projection extending along one side of each one thereof and such different classes of such leaves constituted by the differences in such second openings adapting them to be engaged by such removable post or posts.

3. In a system of loose-leaf-binder construction and leaves therefor, leaves having all of them a common opening or common openings adapted to be engaged by a fixed post or fixed posts in all the binder-frames, all of such leaves having another opening or openings adapted to be engaged by removable posts in the binder-frames, such leaves divided into classes by such other opening or openings therein, binder-frames each having a fixed post or fixed posts adapted to engage the first-mentioned opening or openings in all of such leaves, and a series of removable posts or pairs of posts each adapted to use in any one of such binder-frames but conformed to engage the second-mentioned opening or openings in but one of such classes of leaves, such first openings circular and the fixed posts arranged to engage the same of cylindrical form and such removable posts having a general cylindrical form with a projection extending along one side of each one thereof and such different classes of such leaves constituted by the differences in such second openings adapting them to be engaged by such removable post or posts, the differences in such removable posts or pairs of posts constituted by different angular dispositions of such projections thereon and such correspondingly different classes of such leaves constituted by the different openings therein adapting them for engagement by such different removable posts or pairs of posts.

4. A leaf for a loose-leaf binder having two pairs of openings, each pair adapted to be so engaged by a corresponding pair of prismatic posts that a plurality of such leaves may be held in alinement by either pair of posts independently of the other pair, one of such openings having a lateral extension adapting such leaves to use in a binder-frame in which the corresponding post is provided with a corresponding projecting ridge on one side thereof only when such projecting ridge is angularly alined relative to the lateral extension in such opening therefor.

5. A leaf for a loose-leaf binder having two pairs of openings, each pair adapted to be so engaged by a corresponding pair of prismatic posts that a plurality of such leaves may be held in alinement by either pair of posts independently of the other pair, each opening of one pair having a lateral extension adapting such leaves to use in a binder-frame having the corresponding posts each provided with a corresponding projecting ridge on one side thereof only when such projecting ridges are angularly alined relative to the lateral extensions in such openings therefor.

6. A leaf for a loose-leaf binder having two pairs of openings, each pair adapted to be so engaged by a corresponding pair of cylindrical posts that a plurality of such leaves may be held in alinement by either pair of posts independently of the other pair, one of such openings having a lateral extension adapting such leaves to use in a binder-frame in which the corresponding post is provided with a corresponding projecting ridge on one side thereof only when such projecting ridge is angularly alined relative to the lateral extension in such opening therefor.

7. A leaf for a loose-leaf binder having two pairs of openings, each pair adapted to be so engaged by a corresponding pair of cylindrical posts that a plurality of such leaves may be held in alinement by either pair of posts independently of the other pair, each opening of one pair having a lateral extension adapting such leaves to use in a binder-frame having the corresponding posts each provided with a corresponding projecting ridge on one side thereof only when such projecting ridges are angularly alined relative to the lateral extensions in such openings therefor.

8. In a system of loose-leaf-binder construction, means for mechanically classifying the binder-frames and the leaves for use therewith comprising coöperating irregularities in the impaling-posts and in the openings therefor in the leaves for preventing the use of any such leaves in any classified binder-frame except of the corresponding class and permitting the use of the leaves in all such classes in a common binder-frame substantially the same as any one of the classified binder-frames except as to such means for effecting such mechanical classifications, such common binder-frame adapted to hold the leaves of all such classes in alinement independently of such classifying means.

9. A leaf for a loose-leaf binder having two closed openings each adapted to be engaged by a corresponding prismatic post whereby a plurality of such leaves may be held against withdrawal and in alinement, one of such openings having a lateral extension adapting such leaves to use in a binder-frame in which the corresponding post is provided with a corresponding projecting ridge on one side thereof only when such projecting ridge is angularly alined relative to the lateral extension in such opening therefor.

10. A leaf for a loose-leaf binder having two closed openings each adapted to be engaged by a corresponding prismatic post whereby a plurality of such leaves may be held against withdrawal and in alinement, each of such openings having a lateral extension adapting such leaves to use in a binder-frame in which each corresponding post is provided with a corresponding projecting ridge on one side thereof only when such projecting ridges are angularly alined relative to the lateral extensions in such openings therefor.

11. A leaf for a loose-leaf binder having two closed openings each adapted to be engaged by a corresponding cylindrical post whereby a plurality of such leaves may be held against withdrawal and in alinement, one of such openings having a lateral extension adapting such leaves to use in a binder-frame in which the corresponding post is provided with a corresponding projecting ridge on one side thereof only when such projecting ridge is angularly alined relative to the lateral extension in such opening therefor.

12. A leaf for a loose-leaf binder having two closed openings each adapted to be engaged by a corresponding cylindrical post whereby a plurality of such leaves may be held against withdrawal and in alinement, each of such openings having a lateral extension adapting such leaves to use in a binder-frame in which each corresponding post is provided with a corresponding projecting ridge on one side thereof only when such projecting ridges are angularly alined relative to the lateral extensions in such openings therefor.

13. A leaf for a loose-leaf binder having two openings each adapted to be so engaged by a corresponding prismatic post that a plurality of such leaves may be held thereby in alinement, one of such openings having a lateral extension and such opening and extension therein conformed to permit the use of such leaves in a binder-frame in which the corresponding post is provided with a corresponding projecting ridge on one side thereof only when such projecting ridge is angularly alined relative to the lateral extension in such opening therefor.

14. A leaf for a loose-leaf binder having two openings each adapted to be so engaged by a corresponding prismatic post that a plurality of such leaves may be held thereby in alinement, each of such openings having a lateral extension and such openings and extensions therein conformed to permit the use of such leaves in a binder-frame in which each corresponding post is provided with a corresponding projecting ridge on one side thereof only when such projecting ridges are angularly alined relative to the lateral extensions in such openings therefor.

15. A leaf for a loose-leaf binder having two openings each adapted to be so engaged by a corresponding cylindrical post that a plurality of such leaves may be held thereby in alinement, one of such openings having a lateral extension and such opening and extension therein conformed to permit the use of such leaves in a binder-frame in which the corresponding post is provided with a corresponding projecting ridge on one side thereof only when such projecting ridge is angularly alined relative to the lateral extension in such opening therefor.

16. A leaf for a loose-leaf binder having two openings each adapted to be so engaged by a corresponding cylindrical post that a plurality of such leaves may be held thereby in alinement, each of such openings having a lateral extension and such openings and extensions therein conformed to permit the use of such leaves in a binder-frame in which each corresponding post is provided with a corresponding projecting ridge on one side thereof only when such projecting ridges are angularly alined relative to the lateral extensions in such openings therefor.

HENRY J. MOORE.

Witnesses:
ALBERT C. BELL,
CLARA M. SIENER.